(12) United States Patent
den Hartog

(10) Patent No.: US 11,570,656 B2
(45) Date of Patent: *Jan. 31, 2023

(54) METHOD OF AND A NETWORK SERVER AND MOBILE USER EQUIPMENT FOR PROVIDING CHAT/VOIP SERVICES IN A MOBILE TELECOMMUNICATIONS NETWORK

(71) Applicant: Telefonaktiebolaget LM Ericsson (publ), Stockholm (SE)

(72) Inventor: Jos den Hartog, Ijssel (NL)

(73) Assignee: Telefonaktiebolaget LM Ericsson (pub!), Stockholm (SE)

( * ) Notice: Subject to any disclaimer, the term of this patent is extended or adjusted under 35 U.S.C. 154(b) by 63 days.

This patent is subject to a terminal disclaimer.

(21) Appl. No.: 17/186,506

(22) Filed: Feb. 26, 2021

(65) Prior Publication Data

US 2021/0185556 A1  Jun. 17, 2021

Related U.S. Application Data

(63) Continuation of application No. 16/819,367, filed on Mar. 16, 2020, now Pat. No. 10,939,319, which is a
(Continued)

(51) Int. Cl.
*H04W 28/02* (2009.01)
*H04L 65/1069* (2022.01)
(Continued)

(52) U.S. Cl.
CPC ......... *H04W 28/0268* (2013.01); *H04L 51/58* (2022.05); *H04L 65/1069* (2013.01); *H04L 51/04* (2013.01); *H04W 80/04* (2013.01)

(58) Field of Classification Search
CPC .. H04W 28/0268; H04W 80/04; H04L 51/58; H04L 65/1069; H04L 51/04; H04L 9/40; G06F 15/16
See application file for complete search history.

(56) References Cited

U.S. PATENT DOCUMENTS 6,434,599 B1    8/2002   Porter
6,606,644 B1    8/2003   Ford et al.
(Continued)

FOREIGN PATENT DOCUMENTS

CN      1682208 A    10/2005
EP      1122915 A2    8/2001
(Continued)

*Primary Examiner* — Brian T O Connor
(74) *Attorney, Agent, or Firm* — Coats & Bennett, PLLC

(57) ABSTRACT

A method of and an application server and user equipment for providing at least one of chat and Voice over Internet Protocol, chat/VoIP, services to the mobile user equipment in a mobile telecommunications network. The mobile user equipment comprises a chat/VoIP client for accessing a chat/VoIP service application interfacing the mobile telecommunications network. The chat/VoIP service application interfaces a plurality of proprietary chat/VoIP clients for accessing a plurality of proprietary chat/VoIP communication environments operated by a plurality of chat/VoIP service providers, for providing chat/VoIP services to the chat/VoIP client of the mobile user equipment. The chat/VoIP client and the chat/VoIP service application may be arranged such that privileged use of the mobile telecommunications network is enabled, providing a session between the user equipment and a communication environment with a predetermined or agreed Quality of Service.

22 Claims, 4 Drawing Sheets

Related U.S. Application Data continuation of application No. 16/518,294, filed on Jul. 22, 2019, now Pat. No. 10,631,193, which is a continuation of application No. 15/923,321, filed on Mar. 16, 2018, now Pat. No. 10,405,224, which is a continuation of application No. 15/652,952, filed on Jul. 18, 2017, now Pat. No. 9,930,564, which is a continuation of application No. 14/918,726, filed on Oct. 21, 2015, now Pat. No. 9,723,512, which is a continuation of application No. 13/140,270, filed as application No. PCT/EP2008/010777 on Dec. 17, 2008, now Pat. No. 9,203,873.

(51) Int. Cl.
*H04L 51/58* (2022.01)
*H04L 51/04* (2022.01)
*H04W 80/04* (2009.01)

(56) References Cited

U.S. PATENT DOCUMENTS

| | | | |
|---|---|---|---|
| 6,678,720 B1 | 1/2004 | Matsumoto et al. | |
| 6,711,264 B1 | 3/2004 | Matsumoto et al. | |
| 6,937,566 B1 | 8/2005 | Forslow | |
| 7,072,941 B2 | 7/2006 | Griffin et al. | |
| 7,099,944 B1 | 8/2006 | Anschutz et al. | |
| 7,103,167 B2 | 9/2006 | Brahm et al. | |
| 7,260,087 B2 | 8/2007 | Bao et al. | |
| 7,284,202 B1 | 10/2007 | Zenith | |
| 7,302,273 B2 | 11/2007 | Chaudhuri | |
| 7,353,255 B2 | 4/2008 | Acharya et al. | |
| 7,428,580 B2 | 9/2008 | Hullfish et al. | |
| 7,508,822 B2 | 3/2009 | Tanigawa et al. | |
| 7,603,130 B2 | 10/2009 | Anantha | |
| 7,640,306 B2 | 12/2009 | Appelman et al. | |
| 7,660,868 B1 | 2/2010 | Kembel et al. | |
| 7,701,915 B2 | 4/2010 | Curcio et al. | |
| 7,716,376 B1 * | 5/2010 | Price | G06F 1/12 709/248 |
| 7,899,862 B2 | 3/2011 | Appelman et al. | |
| 8,027,694 B2 | 9/2011 | Carey et al. | |
| 8,131,556 B2 | 3/2012 | Barton et al. | |
| 8,196,175 B2 | 6/2012 | Reed et al. | |
| 8,275,602 B2 | 9/2012 | Curry et al. | |
| 8,289,951 B2 | 10/2012 | Moore et al. | |
| 8,346,887 B1 | 1/2013 | Kembel et al. | |
| 8,499,030 B1 | 7/2013 | Reisman | |
| 8,504,081 B2 | 8/2013 | Waytena, Jr. et al. | |
| 8,510,407 B1 | 8/2013 | Kembel et al. | |
| 8,626,832 B2 | 1/2014 | Jerrard-Dunne et al. | |
| 8,751,667 B2 | 6/2014 | Santamaria et al. | |
| 8,839,327 B2 | 9/2014 | Amento et al. | |
| 8,886,738 B2 | 11/2014 | Anderson | |
| 8,989,713 B2 | 3/2015 | Doulton | |
| 9,203,873 B2 * | 12/2015 | den Hartog | H04L 65/1069 |
| 9,240,963 B2 | 1/2016 | Krantz et al. | |
| 9,319,523 B2 | 4/2016 | Kirchhoff et al. | |
| 9,419,923 B2 | 8/2016 | Seo et al. | |
| 9,723,512 B2 * | 8/2017 | den Hartog | H04W 28/0268 |
| 9,930,564 B2 * | 3/2018 | den Hartog | H04L 51/58 |
| 10,091,460 B2 | 10/2018 | Barsook et al. | |
| 10,405,224 B2 * | 9/2019 | Den Hartog | H04L 65/1069 |
| 10,631,193 B2 * | 4/2020 | den Hartog | H04L 65/1069 |
| 10,939,319 B2 * | 3/2021 | den Hartog | H04L 65/1069 |
| 2003/0187641 A1 | 10/2003 | Moore et al. | |
| 2004/0001480 A1 | 1/2004 | Tanigawa et al. | |
| 2004/0015547 A1 | 1/2004 | Griffin et al. | |
| 2004/0148347 A1 | 7/2004 | Appelman et al. | |
| 2005/0129026 A1 | 6/2005 | Chang et al. | |
| 2006/0130109 A1 | 6/2006 | Zenith | |
| 2006/0168026 A1 | 7/2006 | Keohane et al. | |
| 2006/0276196 A1 | 12/2006 | Jiang et al. | |
| 2007/0010266 A1 | 1/2007 | Chaudhuri | |
| 2007/0055995 A1 | 3/2007 | Jiang | |
| 2007/0220092 A1 | 9/2007 | Heitzeberg et al. | |
| 2008/0059580 A1 | 3/2008 | Kalinowski et al. | |
| 2008/0059986 A1 | 3/2008 | Kalinowski et al. | |
| 2008/0096588 A1 | 4/2008 | Waytena et al. | |
| 2008/0096592 A1 | 4/2008 | Waytena et al. | |
| 2008/0225808 A1 | 9/2008 | Samayoa | |
| 2008/0270611 A1 | 10/2008 | Noldus et al. | |
| 2008/0320085 A1 | 12/2008 | Bouilloux-Lafont et al. | |
| 2009/0094331 A1 | 4/2009 | Nobori et al. | |
| 2011/0072477 A1 | 3/2011 | Foti et al. | |
| 2011/0202347 A1 | 8/2011 | Moore et al. | |
| 2013/0022335 A9 | 1/2013 | Khedour et al. | |
| 2014/0109167 A1 | 4/2014 | Alao et al. | |
| 2015/0180809 A1 | 6/2015 | Doulton | |
| 2016/0156941 A9 | 6/2016 | Alao et al. | |
| 2018/0077254 A1 | 3/2018 | Appelman et al. | |

FOREIGN PATENT DOCUMENTS

| | | |
|---|---|---|
| JP | 2001045044 A | 2/2001 |
| JP | 2001230819 A | 8/2001 |
| JP | 2006287395 A | 10/2006 |
| JP | 2007512744 A | 5/2007 |
| WO | 2008084213 A1 | 7/2008 |

* cited by examiner

METHOD OF AND A NETWORK SERVER AND MOBILE USER EQUIPMENT FOR PROVIDING CHAT/VOIP SERVICES IN A MOBILE TELECOMMUNICATIONS NETWORK

RELATED APPLICATIONS

The present application is a continuation of U.S. patent application Ser. No. 16/819,367, which was filed Mar. 16, 2020, which is a continuation of U.S. patent application Ser. No. 16/518,294, which was filed Jul. 22, 2019 and issued as U.S. Pat. No. 10,631,193, which is a continuation of U.S. patent application Ser. No. 15/923,321, which was filed Mar. 16, 2018 and issued as U.S. Pat. No. 10,405,224, which is a continuation of U.S. patent application Ser. No. 15/652,952, which was filed Jul. 18, 2017 and issued as U.S. Pat. No. 9,930,564, which is a continuation of U.S. patent application Ser. No. 14/918,726, which was filed on Oct. 21, 2015, and issued as U.S. Pat. No. 9,723,512, which is a continuation of U.S. patent application Ser. No. 13/140,270, which was filed on Jul. 15, 2011 and issued as U.S. Pat. No. 9,203,873, which is a national stage application of PCT/EP2008/010777, filed Dec. 17, 2008, the disclosures of each of which are incorporated herein by reference in their entirety.

TECHNICAL FIELD

The present invention relates to handling of services in a mobile communications network, in particular chat and Voice over Internet Protocol, VoIP, services in plurality of dedicated or proprietary chat and VoIP communication environments.

BACKGROUND

Several providers of voice services over Internet Protocol, IP, offer chat and VoIP services, called chat/VoIP, in a dedicated or proprietary chat and VoIP communication environment. A user can register in such a proprietary chat/VoIP communication environment with an appropriate unique identity, ID, or "nickname". When registered, the user has to download and install client software on his User Equipment, UE, which software is required and used to communicate with other registered users, called "buddies", within that particular chat/VoIP communication environment. Often communication, chat and/or VoIP, within such chat/VoIP communication environment is free-of-charge, whereas communication with users in other communication environments operated by different chat/VoIP providers and providing similar chat/VoIP services or public telephony services can be more difficult, not free-of-charge, or not possible at all.

Chat/VoIP clients are designed for Personal Computers, PCs, which have a wired connection (often broadband) to the internet and for wireless or mobile UE, such as but not limited to portable computers or laptops, Personal Digital Assistant, PDA, terminals and mobile phones.

To communicate in different chat/VoIP communication environments operated by different chat/VoIP providers, the user may register separately in all these communication environments, to get a unique ID or nickname and appropriate client software and has to download and install additional proprietary client software on his UE.

When using chat/VoIP services (pre)installed or embedded at a mobile UE operating in a Radio Access Network, RAN, under control of a mobile network provider, the UE and the RAN select a data packet channel that provides a required Quality of Service, QoS, for conducting a voice call, for example. This, because the chat/VoIP client installed on the UE, called the UE chat/VoIP client, is an integral part of the UE, i.e. operating under the communication protocol supported by the UE and the RAN and has received sufficient "privileges" to support the required predefined QoS, i.e. operates in a privileged mode. The RAN may be a mobile network arranged for supporting Global System for Mobile communications, GSM, a General Packet Radio Service, GPRS, or a Universal Mobile Telecommunications System, UMTS, for example. The mobile network provider maintains subscriptions of UEs for users of the RAN for accessing chat/VoIP communication services with an agreed or predefined QoS.

A chat/VoIP provider that provides chat/VoIP services in a chat/VoIP communication environment under control of the mobile network provider in a RAN with a privileged mode, either a proprietary or a standardized chat/VoIP client, is regarded as a privileged chat/VoIP provider, whereas other chat/VoIP providers cannot use the RAN with the same privileged mode.

When a chat/VoIP provider provides a proprietary UE chat/VoIP client that can be installed as an application on the UE, in addition to the (pre)installed or embedded UE chat/VoIP client, this proprietary UE chat/VOIP client however does not have special rights or privileges. This UE chat/VoIP client software runs in a "non-privileged" mode and gets IP-connectivity with only "best effort" quality, as the communication link over the RAN will not be selected on the basis of a defined QoS. It depends on the arrangement and availability of the RAN whether the "best effort" quality is enough for VoIP. When UMTS is available, for example, VoIP should be possible. Otherwise the transmission may not be suitable for VoIP. The user may notice a difference in quality of chat/VoIP communication sessions when using a chat/VoIP connection operated via a RAN with a guaranteed QoS compared to a chat/VoIP connection when using a RAN with only "best effort" quality.

A possible solution to this problem might be to have the UE vendor and the chat/VoIP provider agree that an additionally installed UE chat/VoIP client on the UE may also use like functions and privileges as provided to the already (pre)installed or embedded UE chat/VoIP client, such as selecting "privileged" communication facilities of the RAN providing a required QoS.

However, this solution requires that the UE chat/VoIP client software is trusted SoftWare, SW, for installing on the UE and operating with the RAN. Security-minded users might hesitate to install and deploy such proprietary UE chat/VoIP client software of chat/VoIP providers on their UE.

Moreover most or probably not all chat/VoIP providers will have their proprietary UE chat/VoIP client ported to all types of mobile phones. Such that not all proprietary chat/VoIP communication environments can be accessed by all mobile users, which hampers universal and effective use of the chat/VoIP services.

SUMMARY

It is an object of the present invention to provide an efficient, user friendly, trusted and efficient solution for communicating with mobile UE in different, proprietary or standardized chat/VoIP communication environments operated by different chat/VoIP providers, as well as a network node or application server for a mobile communications network and mobile UE equipped for supporting such method.

A first aspect comprises a method of providing at least one of chat and Voice over Internet Protocol, chat/VoIP, services to a mobile UE in a mobile telecommunications network, the mobile UE comprises a UE chat/VoIP client for accessing a chat/VoIP communication environment. There is provided a chat/VoIP service application interfacing the mobile telecommunications network and interfacing a plurality of application server chat/VoIP clients for accessing a plurality of chat/VoIP communication environments operated by a plurality of chat/VoIP service providers, for providing chat/VoIP services to the UE chat/VoIP client by each accessed chat/VoIP communication environment.

Different from the prior art solutions, wherein a chat/VoIP communication environment is directly accessed under the control of an appropriate, i.e. proprietary or standardized, UE chat/VoIP client installed on the UE, with the invention the chat/VoIP service application and the respective application server chat/VoIP clients act as an interface for the UE chat/VoIP client for accessing a plurality of chat/VoIP communication environments.

Accordingly, a single UE chat/VoIP client on a UE is sufficient for accessing different chat/VoIP communication environments, thereby effectively preventing downloading and installing of different proprietary or standardized chat/VoIP UE clients on the UE, and preventing the accompanying disadvantages such as waste of costly memory and processor capacity on the UE. In particular when a relatively large number of different chat/VoIP communication environments have to be accessed. Also the need for the development of a plurality of different UE chat/VoIP clients for different types of UE and different types of chat/VoIP communication environments and is effectively avoided.

In an example of the invention, interfacing by the chat/VoIP service application comprises:
  connecting to the UE chat/VoIP client,
  connecting to at least one of the plurality of application server chat/VoIP clients,
  acting as a chat/VoIP client towards a connected chat/VoIP communication environment, the chat/VoIP communication environment being proprietary or standardized, and
  acting as a chat/VoIP communication environment towards the UE chat/VoIP client.

To effectively solve problems caused by lack of coordination between several chat/VoIP communication environments, in a further example of the invention the application server chat/VoIP clients provide protocol conversion between a proprietary or standardized chat/VoIP communication environment and the chat/VoIP communication environment provided by the chat/VoIP service application acting towards the UE chat/VoIP client.

It will be appreciated that the protocol conversion may effectively solve and prevent interference problems caused by the simultaneous execution of several chat/VoIP clients.

Users of chat/VoIP services are used to the concept of "nicknames" that is that each user in a chat/VoIP communication environment has a unique nickname or identification under which the user can be addressed in the communication environment. The nickname is usually an ASCII-string.

The concept of nicknames can be effectively supported and adhered to in the present invention, in a further example of which wherein the chat/VoIP service application interfaces the UE chat/VoIP client and the plurality of application server chat/VoIP clients for accessing functions of a chat/VoIP communication environment, among which providing status information of a UE, updating status of buddies, setting up sessions, and accepting sessions.

In a very user friendly example, the chat/VoIP service application provides a single private address book accessible for the UE chat/VoIP client for defining and storing a local nickname or identity in association with a unique nickname or identity created by the chat/VoIP service application for each buddy in a respective proprietary or standardized chat/VoIP communication environment. The chat/VoIP service application determines which unique nickname or identity to be used for a specific chat/VoIP communication environment.

The user may select own local nicknames, which can be more easily to remember as the nicknames provided by the chat/VoIP service application. When the user communicates with the system, only the local nicknames have to be used. The chat/VoIP service application determines which chat/VoIP communication environment to use with a selected nickname.

In a second aspect, there is provided an application server for use in a mobile telecommunications network, comprising processing equipment and communication equipment. The processing equipment is arranged for providing, via the communication equipment, at least one of chat and Voice over Internet Protocol, chat/VoIP, application services to a UE chat/VoIP client in the mobile telecommunications network. The chat/VoIP application service processing equipment is arranged for interfacing a plurality of proprietary or standardized application server chat/VoIP clients for accessing, via the communication equipment, a plurality of proprietary or standardized chat/VoIP communication environments operated by a plurality of chat/VoIP service providers for providing, via the communication equipment, chat/VoIP services to the UE chat/VoIP client by each accessed chat/VoIP communication environment.

In a particular example, the chat/VoIP service application processing equipment and the communications equipment are arranged for supporting Session Initiation Protocol, SIP, signalling in an IP Multimedia Subsystem, IMS.

For supporting an address book of nicknames, in an example, the application server comprises storage equipment interfacing the chat/VoIP service application processing equipment, which storage equipment is accessible, via the communication equipment, to a UE chat/VoIP client of mobile UE for defining and storing a local nickname or identity in association with a unique nickname or identity for use in at least one of the chat/VoIP communication environments.

In a further example, the processing equipment of the application server is arranged for communication, via the communication equipment, with a UE chat/VoIP client of mobile UE, in a manner such that privileged use of the mobile telecommunications network is provided.

By having the interfacing functions with the UE chat/VoIP client and the chat/VoIP communication environments provided by or under control of the application server, which can be operated under control of or in accordance with a negotiated agreement with a mobile network provider, for accessing each proprietary or standardized chat/VoIP communication environment, the communication over the mobile telecommunications network is supported under the rights and privileges granted by the mobile telecommunications network and, accordingly, allows use of special rights and privileges assigned, such as QoS for a particular service, like speech. Accordingly, privileged communication by the chat/VoIP communication environments other than that provided by the mobile telecommunications network provider is enabled. Because the application server can operate under an agreement with the mobile telecommunications network provider, there is no separate agreement required with each UE/OS vendor on a proprietary interface, for each type of UE. Further, no security key exchange of a user with a proprietary chat/VoIP provider is required in case of installed chat/VoIP SW, with privileged use, requiring a security key.

A third aspect comprises a method of providing at least one of chat and Voice over Internet Protocol, chat/VoIP, services by processing equipment in an application server of a mobile telecommunications network, the method comprises the steps of:
  acting as a chat/VoIP client towards a chat/VoIP communication environment, the chat/VoIP communication environment being proprietary or standardized,
  acting as a chat/VoIP communication environment towards a chat/VoIP client of UE in the mobile telecommunications network, and
  protocol conversion between a proprietary or standardized chat/VoIP communication environment and the chat/VoIP communication environment provided towards the UE chat/VoIP client.

The application server is a node connected to the internet or incorporated in a network server or network node of the telecommunications network.

In an example, the protocol conversion comprises coordinating and mapping of chat/VoIP services, features and functions of a chat/VoIP communication environment to and from a UE chat/VoIP client. Examples of such services, features and functions is reporting a status change of the UE chat/VoIP client to the at least one proprietary or standardized chat/VoIP communication environment, a status change of a buddy in the at least one proprietary chat/VoIP communication environment to the UE chat/VoIP client, and others.

In another example, the steps of acting as a chat/VoIP client and acting as a chat/VoIP communication environment in the application servers, comprise setting up and accepting chat/VoIP communication sessions providing privileged use of the mobile telecommunications network, in particular providing an agreed Quality of Service, QoS.

In case a chat/VoIP client SW is allowed to install its proprietary or standardized chat/VoIP interface on the application server, resulting in a privileged RAN use, the chat/VoIP provider is NOT required to update his or her chat/VoIP interface each time the Operating System vendor updates same, or that the UE vendor adds or changes functionality in the UE, which seems to be a frequently occurring event due to market evolution.

In a fourth aspect, there is provided mobile User Equipment, UE, comprising processing equipment connected to input and output equipment and communication equipment, wherein the processing equipment is arranged for providing, via the input and output equipment and communication equipment, at least one of chat and Voice over Internet Protocol, chat/VoIP, services, by processing a UE chat/VoIP client. The UE chat/VoIP client processing equipment is arranged for processing the UE chat/VoIP client for accessing chat/VoIP services of a plurality of proprietary or standardized chat/VoIP communication environments via an application server, wherein the UE chat/VoIP client is arranged to Graphical User differences of the plurality of chat/VoIP communication environments.

In a further example of the mobile UE, the UE chat/VoIP client is arranged to provide a single Graphical User Interface, GUI, via input and output equipment for the plurality of chat/VoIP communication environments. A single GUI is advantageous for the user, which does not need to learn and know proprietary interfaces as many as different chat/VoIP communication environments in which the user would like to have sessions.

In another example, it is advantageous in that the mobile UE comprises a local database connected to the processing equipment for storing and retrieving records comprising nicknames corresponding to nicknames used in the chat/VoIP communication environments.

The invention is particularly suitable with a mobile telecommunications network or platform for supporting rich multimedia communications such as an IP Multimedia Subsystem, IMS, wherein the chat/VoIP service application supports Session Initiation Protocol, SIP, signalling and the UE chat/VoIP client operates as an IMS-based chat/VoIP client.

Accordingly, in a further example, the UE chat/VoIP processing equipment and communication equipment supports IP Multimedia Subsystem, IMS SIP signalling.

The above-mentioned and other features and advantages of the invention will be best understood from the following description referring to the attached drawings. In the drawings, like reference numerals denote identical parts or parts performing an identical or comparable function or operation.

DETAILED DESCRIPTION

The present invention will now be illustrated by way of example and not by way of limitation in a Radio Access Network, RAN, for mobile communication such as a Global System for Mobile communications, GSM, a General Packet Radio Service, GPRS, or a Universal Mobile Telecommunications System, UMTS, network supporting communication with mobile User Equipment, UE, operating in or from a RAN, for the handling of media types such as video, including streaming video, images, audio, Voice over Internet Protocol, VoIP, chat services and data sharing on a data packet oriented communication basis. Hereinafter designated chat/VoIP services. The RAN is operated by or under the control of a mobile network provider.

Figure 1:
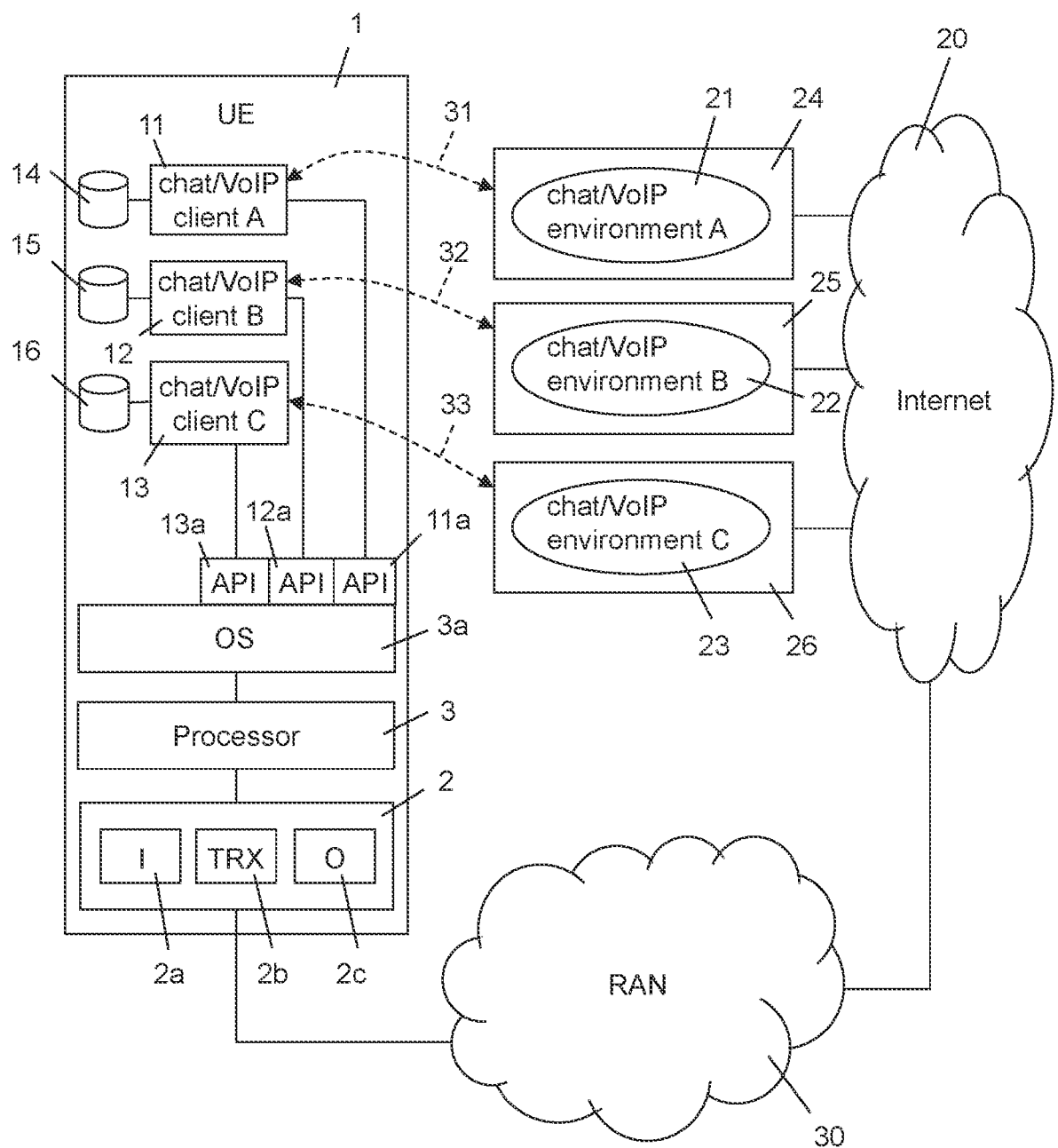
FIG. 1 shows, in a schematic and illustrative manner, a prior art solution of chat/VoIP communication service with a plurality of proprietary or standardized chat/VoIP communication environments from a single user equipment.

In FIG. 1, reference numeral 1 indicates a prior art UE such as, but not limited to, a mobile telephone, mobile laptop computer, Personal Digital Assistant, PDA, etc. The UE 1 comprises a processor 3 connected to an Input/Output, I/O, subunit 2, comprising input devices 2a such as a keyboard, mouse, microphone, etc. and output devices 2c such as a display, loudspeaker, etc. The I/O subunit 2 further comprises a communication transceiver 2b for exchanging data with a mobile telecommunications network, i.e. RAN 30.

Reference numeral 20 indicates the Internet, to which several devices 24, 25, 26 that host chat/VoIP communication environments connect, i.e. a chat/VoIP communication environment A, 21; a chat/VoIP communication environment B, 22; and a chat/VoIP communication environment C, 23, respectively. All these chat/VoIP communication environments 21, 22, 23 are either standardized or proprietary, i.e. non-standardized, and hosted or operated by different chat/VoIP service providers. Although just three chat/VoIP communication environments have been shown, in practice more or less chat/VoIP communication environments are feasible, and chat/VoIP communication environments operating in other networks, public or private. All this is to be considered as being encompassed by the environments and network shown.

For communication with each chat/VoIP communication environment 21, 22, 23 appropriate communication, control and user interfacing software, called UE chat/VoIP clients, are installed on the UE 1, i.e. UE chat/VoIP client A, 11, for providing chat/VoIP services with chat/VoIP communication environment A, 21; UE chat/VoIP client B, 12, for providing chat/VoIP services with chat/VoIP communication environment B, 22; and UE chat/VoIP client C, 13, for providing chat/VoIP services with chat/VoIP communication environment C, 23. Each UE chat/VoIP client 11, 12, 13 applies an application protocol for Internet Protocol, IP, peer to peer connectivity to the chat/VoIP communication environment 21, 22, 23, schematically indicated by dashed arrows 31, 32, 33, respectively. The UE chat/VoIP clients 11, 12, 13 on the UE 1 are executed under control of an Operating System, OS 3a, processed by the processor 3.

The chat/VoIP communication environments 21, 22, 23 are processes required for establishing and maintaining specific chat/VoIP communication sessions. These processes are executed at devices 24, 25, 26 such as servers and/or terminals connected to the Internet 20. Examples of such devices 24, 25, 26 are:
- a terminal, such as a UE, that hosts a Chat/VoIP communication environment 21, 22, 23, and supports, for example, a communication session, such as a voice call, with a UE chat/VoIP client 11, 12, 13 executed at UE 1;
- a server that hosts a chat/VoIP communication environment 21, 22, 23 and used, for example, to monitor the status of a UE chat/VoIP client 11, 12, 13 executed at UE 1, or to control a registration request of a UE chat/VoIP client 11, 12, 13, or to control a communication session between a UE chat/VoIP client 11, 12, 13 and a chat/VoIP client executed at, for example, another terminal.

For identifying purposes, in the chat/VoIP communication environments 21, 22, 23 users are known and registered under "nicknames". These nicknames are stored in an address book at the UE 1, one for each UE chat/VoIP client 11, 12, 13, schematically indicated by databases 14, 15, 16. In an address book nicknames may be stored of other users of the corresponding chat/VoIP environment, called "buddies". It will be appreciated that this information may also be stored in a database provided by a chat/VoIP provider (not shown). Further, status information may be stored in the address book, i.e. permanent or temporary information, for example availability of a buddy or other data relating to a chat/VoIP communication.

UE chat/VoIP clients 11, 12, 13 are applications that are enabled by an Application Program Interface, API, and executed by the processor 3 under control of the OS 3a. The UE chat/VoIP client applications 11, 12, 13 are respectively executed via API 11a, 12a and 13a. The API can be distinguished in an either proprietary or standardized interface. If proprietary, the API is meant to be used by a single chat/VoIP provider, not allowing other chat/VoIP providers to use this API. A standardized API applies published interfaces to the OS 3a, such that chat/VoIP providers are enabled to design chat/VoIP applications enabling execution of functions by means of processor 3 under control of OS 3a.

The API may further be distinguished in a privileged and non-privileged interface, where privileges may comprise:
- enabling a download of an application, where this download only succeeds when the application comprises some form of a security key;
- installing or executing a downloaded application which is allowed under a specific condition, such as complying with a security check;
- executing certain functions by the processor 3 in a specific way, e.g. the setup of a network path via the RAN is according to a specific Quality of Service, QoS.

In practice, OS 3a may support several APIs, where these APIs are characterized by combinations of proprietary/standardized and privileged/non-privileged interfaces.

For the purpose of explanation, it is now assumed that UE chat/VoIP client 11 is (pre)installed on the UE 1 by the radio network provider of the RAN 30, such that this UE chat/VoIP client 11 applies a proprietary and privileged API 11a. Optionally this UE chat/VoIP client 11 may be embedded within the OS of UE 1 together with API 11a.

For the purpose of explanation it is further assumed that the UE chat/VoIP clients 12, 13 are not (pre)installed by the network provider of the RAN 30, but additionally initialised by the user, for example when registering for the first time at the corresponding chat/VoIP communication environment 22, 23. The UE chat/VoIP client 12 is a proprietary client different from client 11 and applies the non-privileged API 12a. The UE chat/VoIP client 13 is a standardized client different from clients 11 and 12 and applies the non-privileged API 13a.

Because the UE chat/VoIP client 11 applies the privileges enabled by API 11a, its peer to peer communication session 31 is set up using all privileges and rights provided and/or predefined by the OS 3a supporting API 11a, such as a privileged use of RAN 30 with a communication protocol according to a required QoS, for VoIP. The IP connectivity for the communication session 31 is arranged via transceiver 2b, RAN 30, and Internet 20, towards an IP interface of device 24.

The use of RAN 30 is in this case a so called "privileged" use as network parameters for the agreed QoS, such as a guaranteed bandwidth, latency and iso-synchronity are applicable. This can be the case where, for example, the user of UE 1 has a subscription with the RAN provider, obliging the RAN provider to deliver an agreed QoS for communication session 31.

To the contrary, the chat/VoIP communication sessions 32, 33 initiated by the proprietary chat/VoIP UE clients 12, 13 cannot benefit from the "privileged" use of RAN 30 as non-privileged APIs 12a, 13a do not support special rights or privileges. The execution of non-privileged UE chat/VoIP client applications 12, 13 results in a non-privileged use of RAN 30 based on "best effort". Not receiving a guaranteed QoS for a chat/VoIP communication session may result in poor speech communication, for example, or no speech communication at all.

Using the privileged API 11a by the chat/VoIP provider of UE chat/VoIP client 12, 13 is not an option, as the OS 3a does not allow to use API 11a, being a proprietary API installed or provided by the RAN provider, by any other UE chat/VoIP client than client 11.

Figure 2:
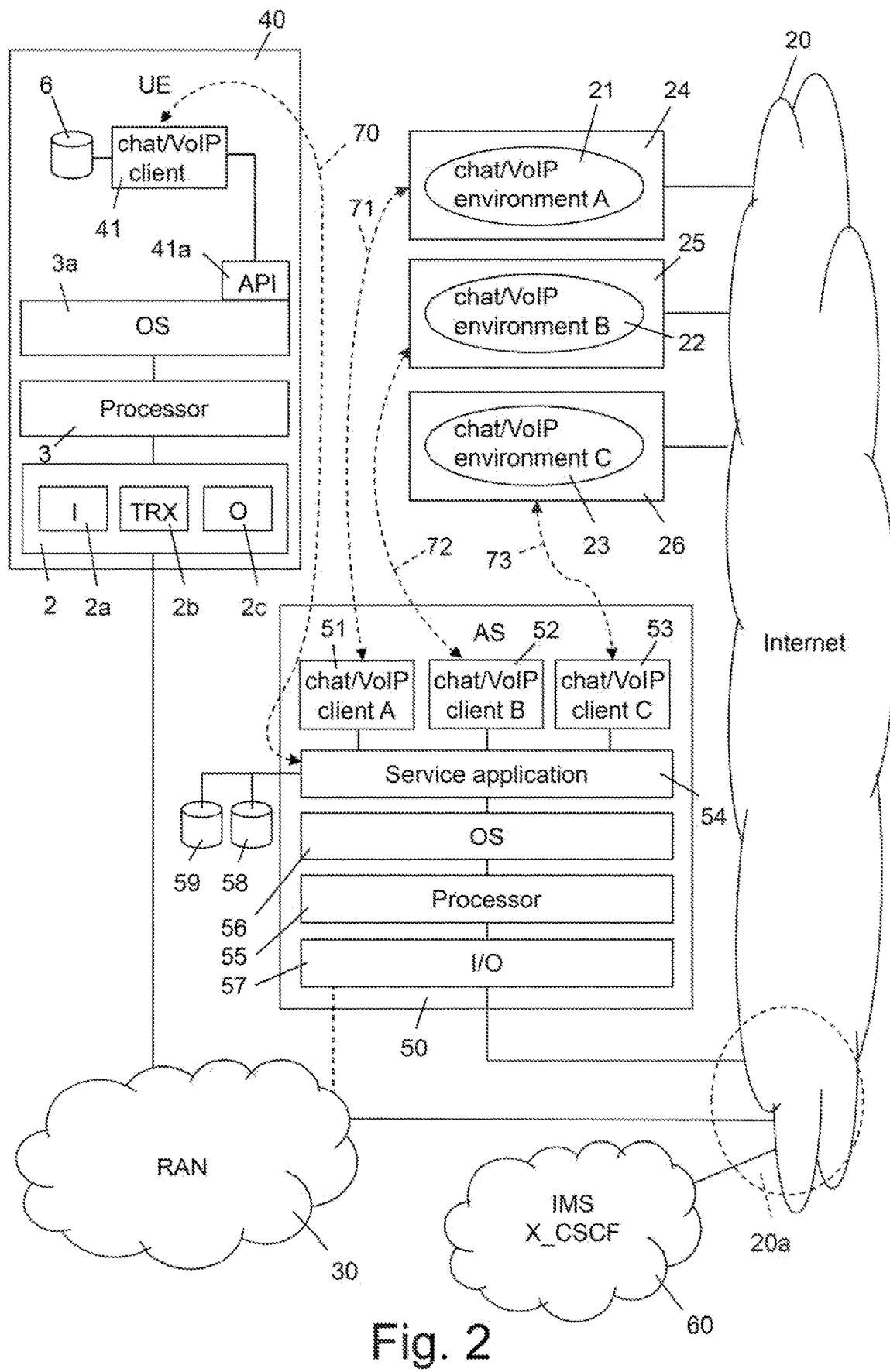
FIG. 2 shows, in a schematic and illustrative manner, chat/VoIP communication from a single user equipment with a plurality of proprietary or standardized chat/VoIP communication environments in accordance with an example of the invention.

FIG. 2 shows an example of the invention. UE 40 comprises an Internet Protocol, IP, based User Equipment, UE, chat/VoIP client 41, which enables a privileged use of the RAN 30, for all chat/VoIP communication environments used by a user of UE 40 as disclosed above in connection with FIG. 1.

As to solve the problem of having only "best effort" IP connectivity for chat/VoIP communication sessions 32, 33, provided by chat/VoIP providers that cannot use a privileged API, the UE 40 applies a single UE chat/VoIP client 41.

This UE chat/VoIP client 41 will be provided by a UE vendor, a RAN network provider or a chat/VoIP provider who has arrangements with the RAN network provider for providing privileged use of the RAN 30.

UE chat/VoIP client 41 interfaces to the OS 3a via API 41a, which is designed to provide a "privileged" use of RAN 30 for achieving an agreed QoS. Processor 3, under control of OS 3a of the UE 40, is arranged, as in FIG. 1, to initiate IP connectivity to the internet 20 via the transceiver 2b and RAN 30, when UE chat/VoIP client 41 operates as a single chat/VoIP client for communication sessions with multiple chat/VoIP environments 21, 22, 23.

The RAN 30 and the Internet 20 comprise processing and communication means for executing a call setup request from the UE chat/VoIP client 41 to a chat/VoIP service application 54 at an Application Server, AS, 50 via RAN 30 and Internet 20, in accordance with the invention.

With reference to FIG. 2, the AS 50 has a processor 55, under control of an Operating System (OS) 56 and is connected to an I/O subunit 57 for exchange of data. The AS 50 is connected and communicates by means of the I/O subunit 57 via the Internet 20 or a proprietary link to the RAN 30 (shown in dashed lines).

AS 50 can be a node connected to the internet 20 or can be incorporated in an application or network server or network node of the telecommunications network, i.e. the RAN 30. It is proposed that the AS 50 operates under control of the provider of the RAN 30 or at least a trusted party with respect to the user of UE 40.

The part of the Internet 20 shared by the RAN 30 and the AS 50 can be deployed alternatively to the Internet 20 as, for example, a separate connection, a Circuit Switched network or Asynchronous Transfer Mode network connected via secure means, such as a firewall, to the global Internet 20 for security reasons or bandwidth requirements. Optionally this part of the Internet 20 is configured as a separate environment 20a for security reasons.

The AS 50 executes a universal chat/VoIP service application 54, which is arranged to perform client and server tasks for a plurality of proprietary or standardized AS chat/VoIP clients 51, 52, 53 arranged for communication to a plurality of the chat/VoIP communication environments 21, 22, 23, respectively. AS chat/VoIP clients 51, 52, 53 constitute software or hardware that is designed to cooperate with the universal chat/VoIP service application 54. The AS chat/VoIP client 51, 52, 53 provides a protocol conversion between a proprietary or standardized chat/VoIP communication environment 21, 22, 23 and the service application 54.

The universal chat/VoIP service application 54 is arranged to perform a coordinating and mapping of specific chat/VoIP services environment features or functions, such as icon-function and -representation, to and from the single user interface represented at UE 40 by means of UE chat/VoIP client 41. Providers of Chat/VoIP services have to agree with the provider of the RAN 30 on a set of capabilities of RAN 30 to be used, such as the privileged use, and provide the AS chat/VoIP client software 51, 52, 53 that cooperates with service application 54, as to benefit from the universal use of the invention.

The provider controlling the AS 50 provides a suitable interface or API to the service application 54, that according to the agreement with the chat/VoIP provider supports a QoS that allows to define a minimum bandwidth of the RAN, designated as "privileged" RAN use, instead of relying to the RAN's "best effort" basis.

Apart from a privileged RAN use, other features, such as use of network services, can be agreed between the provider of the AS 50 and the chat/VoIP provider, enabled by means of service application 54.

Service application 54 is further arranged to communicate, in a proprietary or standardized way, with UE chat/VoIP client 41 via API 41a at UE 40, such that the privileged use of the RAN 30 is guaranteed.

As an example, if a buddy status of chat/VoIP environment A 21 changes, AS chat/VoIP client 51 signals this status change to service application 54, and subsequently service application 54 decides to signal UE chat/VoIP client 41, which may represent this status change at the user interface of UE 40.

Further examples of functions of the universal chat/VoIP service application 54 are setting up chat/VoIP communication sessions and accepting chat/VoIP communication sessions.

Other functions that the service application 54 may perform are, but not limited to:
- acting as interworking unit for signalling between an AS chat/VoIP client 51, 52, 53 and the chat/VoIP client 41;
- coordinating input and/or output streams between an AS chat/VoIP client 51, 52, 53 and the chat/VoIP client 41;
- providing access to services offered by the mobile telecommunications network RAN 30 for an AS chat/VoIP client 51, 52, 53;
- reading and representing at the UE 40 in a single Graphical User Interface, GUI, statuses from different AS chat/VoIP clients 51, 52, 53;
- selecting which AS chat/VoIP client 51, 52, 53, to use when setting up a chat/VoIP session from UE 40.

Service application 54 can be implemented as a sub-unit within AS 50 as either hardware or software.

UE chat/VoIP client 41 is arranged to perform a general chat/VoIP user interface in cooperation with service application 54 to the user of UE 40, using input devices 2a and output devices 2c. API 41a is provided by the OS vendor (or UE vendor when the OS 3a is comprised by the UE 40) and is designed to support UE chat/VoIP client 41 with privileged RAN 30 use.

As indicated above, although just three chat/VoIP communication environments have been shown, in practice more or less chat/VoIP communication environments are feasible and chat/VoIP communication environments operating in other networks, public or private. All this is to be considered as being encompassed by the environments and network shown.

Referring back to FIG. 1 and, as illustratively shown in FIG. 2, the chat/VoIP communication sessions 31, 32, 33 although operating on different chat/VoIP communications environments 21, 22, 23 now, in the example of the invention, receive privileged RAN QoS treatment, via API 41a by means of processor 3 under control of OS 3a of the UE 40, while the UE chat/VoIP client 41 operates as the universal chat/VoIP client for communication sessions 31, 32, 33.

UE chat/VoIP client 41, in cooperation with service application 54 and the AS chat/VoIP client 51, 52, 53 is regarded as a universal chat/VoIP client service. Chat/VoIP communication environment 21, 22, 23 will notice no difference between a session towards UE chat/VoIP client 11, 12, 13 with respect to FIG. 1, and a session towards AS chat/VoIP client 51, 52, 53 with respect to FIG. 2.

While effectively avoiding the need for downloading, installing, and executing of different, proprietary, software UE chat/VoIP clients 11, 12, 13 on the UE, in this example of the invention, the user of the UE 40 maintains the possibility of communication with all the chat/VoIP communication environments 21, 22, 23 registered with, and has the benefit of applying chat/VoIP communication sessions via a privileged RAN connection according to an agreed QoS for each chat/VoIP provider.

The AS chat/VoIP client 51, 52, 53 executed at the AS 50 can be appropriately developed and maintained by a mobile RAN 30 network provider in connection with chat/VoIP service providers.

In FIG. 2, the IP peer to peer connectivity between the UE 40 and the chat/VoIP environments 21, 22, 23, executed at devices 24, 25 and 26 respectively are depicted as dashed lines 71, 72, 73. According to the invention, there is not a one to one IP peer to peer connection with communication sessions 31, 32 and 33, as shown in FIG. 1, but a stepped connection comprising:
- a single IP peer to peer link 70 between the UE 40 comprising UE chat/VoIP client 41 and the service application 54 comprised by AS 50;
- a one to many IP peer to peer link 71, 72, 73, from the AS 50 comprising service application 54, to the devices 24, 25, 26 comprising the chat/VoIP communication environments 21, 22, 23.

Figure 3:
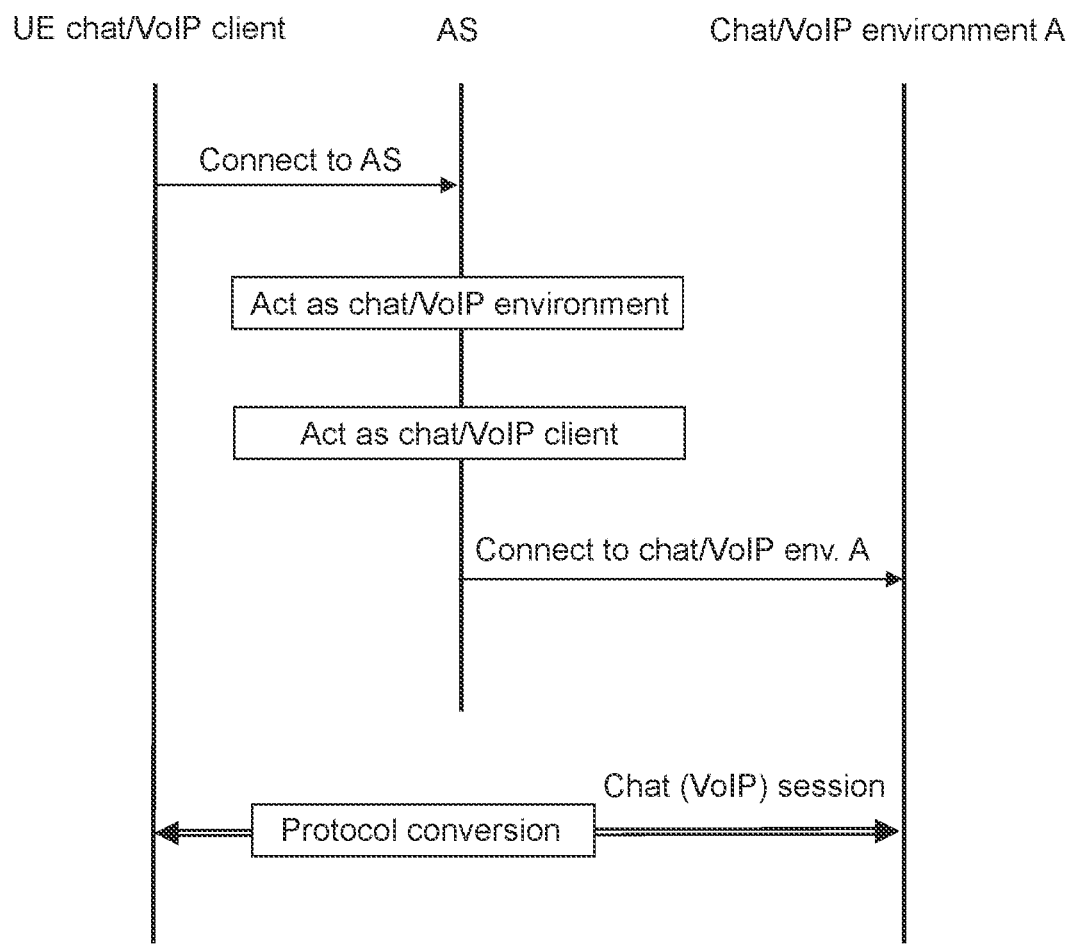
FIG. 3 illustrates a method performed by an application server arranged for providing chat/VoIP services to mobile UE in accordance with an example of the invention.

FIG. 3 illustratively shows an example of steps performed by the AS 50, i.e. the service application 54 an the AS chat/VoIP client 51, 52, 53 for providing chat/VoIP services between UE 40 and communication environment A, 21, for example.

It is assumed that UE chat/VoIP client 41 initiates a chat/VoIP session and connects to processing equipment 54, 55, 56 of the AS 50, via the transceiver 2b of the UE 40, RAN 30 and the I/O subunit 57 of the AS 50. In response to this connection, the AS 50 acts as a chat/VoIP environment towards the UE chat/VoIP client 41.

Based on the information provided by the UE chat/VoIP client 41, such as the nickname of a user to be contacted in the chat/VoIP communication environment A, 21, the processing equipment 54, 55, 56 of the AS 50 contacts the chat/VoIP communication environment A, 21, via the appropriate AS chat/VoIP client 51, and acts a chat/VoIP client towards the communication environment A, 21. Although shown separately, it will be appreciated that the AS chat/VoIP client 51 may be integral to the processing equipment 54, 55, 56 of the AS 50.

In the chat/VoIP session established, the AS 50 provides protocol conversion for the communication and services exchanged between the chat/VoIP communication environment A, 21, and the UE chat/VoIP client 41 of the UE 40.

In the event that the communication environment A, 21, initiates a chat/VoIP session towards the UE 40, the AS 50 likewise acts a chat/VoIP client towards the communication environment A, 21 and as a chat/VoIP communication environment towards the UE chat/VoIP client 41.

For further chat/VoIP session between the UE 40 and other chat/VoIP communication environments B, 22, or C, 23, the AS 50 acts as a proprietary or standardized chat/VoIP client 52, 53 for the chat/VoIP communication environments B, 22, or C, 23, respectively, but as a universal chat/VoIP communication towards the UE chat/VoIP client 41 of the UE 40.

Without being restricted to any technology for implementation, the invention is further elucidated by means of an implementation in an Internet protocol Multimedia Subsystem, IMS, core network 60.

The IMS-core network 60 enables rich multimedia communications sessions with the UE 40 for the handling of chat/VoIP services, but also handling of media types such as video, including streaming video, images, audio, and data sharing on a data packet oriented communication basis. For the remainder of this description, the term chat/VoIP represents all the media types listed above where appropriate. IMS unifies applications that are based on Session Initiation Protocol, SIP, signalling which enables multimedia sessions.

The UE 40 comprises a single, IMS based, UE chat/VoIP client 41. This UE chat/VoIP client 41 will be provided by a provider who has arrangements with the RAN 30 network provider who can also provide the IMS-core network 60, or has an agreement with an IMS-core network 60 network provider.

The IMS-core network 60 operates by means of a plurality of servers, or nodes, such as a Serving Call Session Control Function, S-CSCF, an Interrogating Call Session Control Function, I-CSCF, and a Proxy Call Session Control Function, P-CSCF, designated by reference numeral 61. The S-, I- and P-CSCF servers 61 comprise processing and communication means for executing a call setup request initiated by the UE chat/VoIP client 41 to a chat/VoIP service application 54 at the AS 50 in accordance with the invention, supporting a Session Initiation Protocol, SIP, signalling, hereinafter called SIP-AS, 50.

As additional to illustrated above, the part of the Internet 20 shared by the RAN 30, the SIP-AS 50 and the IMS-core network 60, a part 20a, can optionally be configured as a separate environment for security reasons.

With reference to the FIGS. 4 and 5 examples of signalling scenarios for chat/VoIP communication sessions in accordance with the invention will be discussed.

For the ease of explanation, the setup of a connection by the UE 40 towards the SIP-AS 50 by means IMS-core network 60 is regarded as accomplished according to prior art methods. Receiving or sending signals at SIP-AS 50 is performed by I/O subunit 57 connected to the processor 55 under control of OS 56.

Referring to FIG. 2, before any communication with the chat/VoIP environment 21, 22, 23 is able, the user of UE 40 has to register to the environment 21, 22, 23. This registration action is has to be done once and may be performed by a device capable to connect to the environment 21, 22, 23, such as UE 40, but also from various other devices, such as a Personal Computer. The user of UE 40 can use different or identical nicknames in each environment 21, 22, 23.

The registration action initialized at UE 40 is performed by selecting a menu option at the UE 40, provided by UE chat/VoIP client 41, listing the available environments 21, 22, 23, corresponding to the available AS chat/VoIP clients 51, 52. 53 present at SIP-AS 50.

For each environment 21, 22, 23 registered to, the user may select its own nickname, which is stored in a database 58 as a record, "own nickname—environment name" for the user of UE 40. Database 58 is communicatively connected to service application 54. A required password for each environment 21, 22, 23 might either be stored at database 58, stored at UE 40 in database 6 or provided on request by the user of UE 40. The database 6 is communicatively connected to UE chat/VoIP client 41. FIG. 4 shows registration in chat/VoIP communication A and B 21, 22, with nicknames A, B, respectively.

Figure 4:
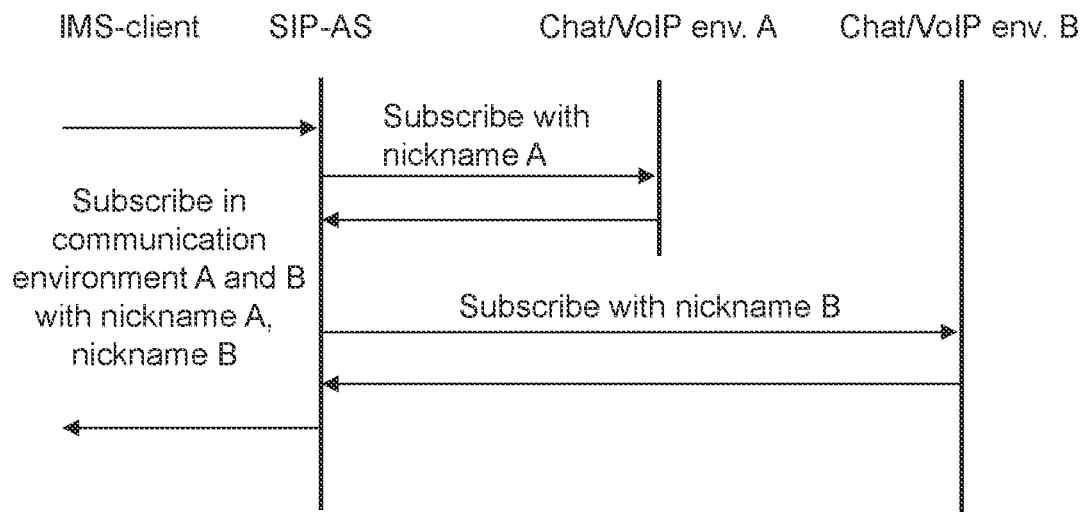
FIG. 4 illustrates signalling steps when a user of an IMS-based UE chat/VoIP client registers to a chat/VoIP communication environment in accordance with an example of the invention.
Figure 5:
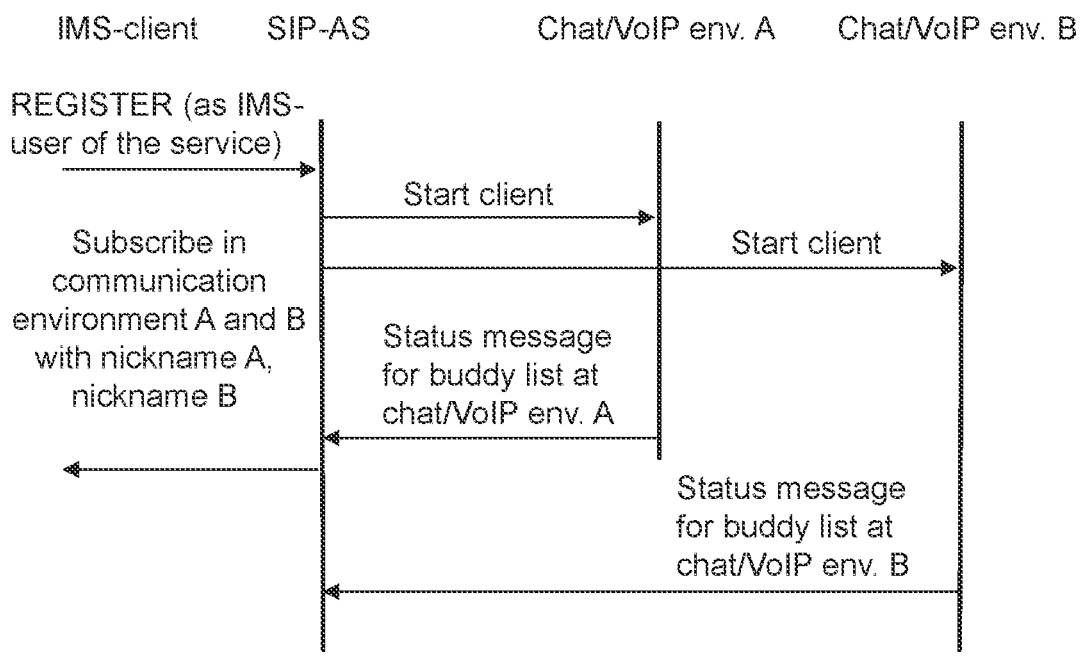
FIG. 5 illustrates signalling steps when a user of the IMS-based UE chat/VoIP client starts chat/VoIP communication sessions.

Referring to FIG. 4 when a user starts his IMS-based UE chat/VoIP client 41 on his UE 40, the service application 54 of SIP-AS 50 is notified of this action, using the SIP REGISTER message, as usual for the IMS Presence service. Alternatively the start-up of UE chat/VoIP client 41 is initialized by powering on the UE 40.

On starting up UE chat/VoIP client 41, this client 41 signals the service application 54 on its status change. Service application 54 retrieves the records "own nickname—environment name" record for the user of UE 40 from its database 58 and informs the appropriate environments, by signalling the appropriate available AS chat/VoIP client 51, 52, 53 that acts towards the chat/VoIP communication environment 21, 22, 23 as normal client-SoftWare (client-SW) that has been started.

These "client-SW" AS chat/VoIP clients 51, 52, 53 report themselves (FIG. 4 "start client") to the chat/VoIP environments 21, 22, 23 with their appropriate nickname and status of the user of UE 40, and receive from the environments 21, 22, 23 status information (FIG. 4 "status msg . . . ") as belonging to the users in the buddy-lists within these environments 21, 22, 23. The service application 54 of SIP-AS 50 combines the received status information from the different environments 21, 22, 23 into status information as according to IMS Presence. Any required password may be provided as suggested above.

When the user of the UE 40 changes his status e.g. to unavailable for all chat/VoIP communication sessions, the UE chat/VoIP client 41 reports this change to the service application 54 of SIP-AS 50, the service application 54 reports this status change to all involved chat/VoIP communication environments 21, 22, 23 via AS chat/VoIP clients 51, 52, 53 for the appropriate chat/VoIP environments where the user of UE 40 has been registered, i.e. where the database 58 comprises environment records "nickname—environment" for, and which are available.

In case a buddy of a chat/VoIP environment 21, 22, 23 changes its status, the involved chat/VoIP environment 21, 22, 23 reports this change to the service application 54 at SIP-AS 50 via the AS chat/VoIP client 51, 52, 53, and the service application 54 reports this change in turn to the UE chat/VoIP client 41, which can display this information to the user at the display 2c.

When the user of UE 40 sets up an outgoing chat/VoIP communication session with as "called party" a buddy of the chat/VoIP environment 21, 22, 23, an IMS session is started towards service application 54 by sending a SIP INVITE message to SIP-AS 50. As an example a chat/VoIP session to buddy "Bob128" from the buddy list is started up by the user of UE 40, wherein "Bob128" is a nickname for a buddy or party from environment B, stored in database 58.

The service application 54 of SIP-AS 50 handles this setup by checking in database 58 to which chat/VoIP communication environment A, B or C 21, 22, 23 the "called party" belongs. The service application 54 selects the appropriate AS chat/VoIP client 51, 52, 53 to set up a communication session within that communication environment 21, 22, 23.

In case "Bob128" is defined in more than one chat/VoIP environment 21, 22, 23, a message is sent by service application 54 to the UE 40 offering the user a menu listing the environments to select from. When the "called party" accepts, a chat/VoIP-session is started.

In the case of an incoming request for a chat/VoIP session, a buddy within the chat/VoIP communication environment 21, 22, 23 e.g. "Bob128" in chat/VoIP-environment B 22 starts a chat/VoIP session setup request towards the user of UE 40, using the nickname, as has been chosen by the user of UE 40 as to be used within that environment B. The communication session B 22 terminates in the AS chat/VoIP client 52 in the SIP-AS 50, which acts as client-SW for environment B, depicted as IP peer to peer connection 72. The AS chat/VoIP-client 52 signals service application 54 to deliver the setup request, via IMS-core network 60 and RAN 30 to the UE chat/VoIP client 41, as depicted by IP peer to peer link 70. The user gets on his UE 40 an incoming chat/VoIP-session, from "Bob128@chat/VoIP-environment-B". When the "called party" i.e. the user of UE 40 accepts, a chat/VoIP-session is started.

When multiple communication sessions are ongoing with buddies in several chat/VoIP communication environments 21, 22, 23, the UE chat/VoIP-client 41 in cooperation with the service application 54 provides optionally a menu list at UE 40 for coordinated use of the UE's 40 I/O devices (microphone, speaker, display) for these sessions as to prevent confusion.

As a consequence of the advantageous application of a single UE chat/VoIP client 41 at the UE 40, effectively resulting in a defined RAN QoS, additional advantages are provided.

Users of chat/VoIP client software, in general, are used to the concept of a nickname, as elucidated above. When registering to a chat/VoIP communication environment, the chat/VoIP communication environment assures that the chosen nickname is not yet used, i.e. unique.

To support the common notion of nicknames, the user of the "universal UE chat/VoIP-client" service in accordance with the invention also uses nicknames to address buddies in the different chat/VoIP communication environments that he or she is registered to.

In an alternative, the user of UE 40 selects a specific buddy belonging to chat/VoIP communication environment 21, 22, 23 for an outgoing chat/VoIP communication session and the service application 54 will start up the appropriate AS chat/VoIP client 51, 52, 53 as elucidated above.

Optionally the user of UE 40 may define more appropriate names in case buddies have almost similar nicknames in different environments, in case a Bob128 exists in environment 22 and a Bob122 exists in environment 21, for example.

The phonebook of the user of UE 40 may comprise the buddies indicated in an alternative way. Local database 6 is arranged to store records comprising nicknames of buddies of any communication environment, which can be stored under a name, given by the user of UE 40. The UE chat/VoIP client 41 is arranged to store at local database 6 an alternative local buddy nickname, such as "Bob@A" for "Bob122" as buddy residing in chat/VoIP environment A 21. When local buddy name "Bob@A" is selected as chat/VoIP buddy, the UE chat/VoIP client 41 checks local database 6 for the appropriate real nickname, and initializes a chat/VoIP communication session with the real nickname "Bob122" towards service application 54.

In case a nickname, e.g. "Bob120" applies to two buddies in two different environments A 21 and B 22, the use of the local database 6 is even more beneficial as the UE chat/VoIP client 41 stores records for local buddy names "Bob@A" and "Bob@B" in the local database 6 with an identifier of the appropriate chat/VoIP environment A 21, and B 22. UE chat/VoIP client 41 is arranged to check for each newly entered nickname whether the name already exists in local database 6. In case of an existing nickname a menu-list of available AS chat/VoIP clients 51, 52, 53, corresponding to chat/VoIP environments 21, 22, 23 is provided by the service application 54 to the UE 40 to have the user initialize a selection of the appropriate environment 21, 22, 23 for the existing real nicknames "Bob120" and the newly entered "Bob120. On selection of an environment for a nickname a record comprising the local nickname "Bob@A", the real nickname "Bob120" and the identifier representing the environment is stored in local database 6.

When the user of UE 40 selects local nickname "Bob@A" for setting up a chat/VoIP connection, UE chat/VoIP client 41 selects the record with the real nickname and the identifier, and submits this information to the SIP-AS 50, where service application 54 supports the selection of the appropriate AS chat/VoIP client 51 to be started up according to the provided identifier for real nickname "Bob120".

The user of UE 40 is free to map any local nickname on real nicknames.

When the chat/VoIP communication environment 21, 22, 23 has information that a certain user in the environment's network is an IMS-based user (i.e. the user does not use their "regular PC-based chat/VoIP client", but uses an IMS-based UE chat/VoIP-client 41, such as a mobile telephone, deployed via the IMS-service "chat/VoIP-client"), the chat/VoIP communication environment 21, 22, 23 can offer additional functions to this user and/or buddies.

a) Location:

When a user uses a UE 40, for example, the service application 54 in the SIP-AS 50 subscribes to an IMS-based service "Location" to publish the location of the UE 40 to the chat/VoIP environment 21, 22, 23 via AS chat/VoIP clients 51, 52, 53. When location information is changed, the service application 54 receives this information from the 'Location" service and can decide to send a status update (including the new location) to one or more chat/VoIP communication environments 21, 22, 23. Additionally the user of UE 40 may allow the location services when the UE status is "idle" or "busy".

b) Payment or Charging:

Regular users, using a "regular PC-based chat/VoIP client", can pay for services offered by the chat/VoIP communication environment 21, 22, 23 (for example call out to the Public Switched Telephone Network). For this payment, an account for each communication environment 21, 22, 23 must be created. Security-minded users may not want to deposit money on accounts of one or more chat/VoIP providers. However, they most probably don't object to paying for services in such environments using their mobile RAN provider, in most cases being the usual trusted chat/VoIP provider as payment broker.

IMS-based users can pay (when their IMS-provider wants to act as payment-broker) via their telephone bill at the IMS-network provider. Alternatively SIP-AS 50 may comprise or be connected to a deposit account 59 for chat/VoIP environments. SIP-AS 50, maintained by the trusted network provider of RAN 30, the IMS provider or another trusted party, is regarded as trusted. Each AS chat/VoIP client 51, 52, 53 can be designed according to predefined rules in cooperation with service application 54 to debit deposit account 59 for use of services.

When services in a particular chat/VoIP communication environment require payment, a trust relation between user and chat/VoIP provider or providers, when using several chat/VoIP communication environments, is required.

c) Authentication:

A Regular UE chat/VoIP client 11, 12, 13 needs authentication in the form of an ID and password, so authentication which is based on "what you know", such as providing a specific password by the user.

When the AS chat/VoIP client 51, 52, 53 has (via the service application 54, and IMS-core network 60) access to IMS-Authentication services, the Subscriber Identification Module-card of the mobile telephone can be used for authentication via IP peer to peer link 70. When the IMS-based UE chat/VoIP client 41 uses also ID and password, this authentication is based on "what you know & what you have", which provides better security.

As a further advantage the execution of a single UE chat/VoIP client 41 instead of a multitude of chat/VoIP clients 11, 12, 13 reduces the need for processor 3 capacity, lowers power-usage resulting in a longer use of batteries, and requires less memory.

Apart from providing a defined minimum bandwidth at the RAN 30 instead of "best effort", application of the invention enables:

a predefined GUI, at the I/O subunit 2 of the UE 40. The prior art chat/VoIP UE client 11, 12, 13 deployed at the UE 1 has its own software, its own buddy lists of IDs or nicknames, its own identifiers, a proprietary user interface where statuses of buddies are presented, and so on. This confusing representation is improved by a single GUI for all supported communication environments 21, 22, 23 and enables a consistent overview of the functionality provided by the environments. The single UE chat/VoIP client 41 is a universal client as the supported communication environments 21, 22, 23 use the same GUI;

access to additional services offered by the mobile telecommunications network RAN 30 for an AS chat/VoIP client 51, 52, 53, via the SIP-AS 50, resulting into telephony services deployed in the chat/VoIP environments 21, 22, 23;

enabling of UE capabilities, such that OS 3a of UE 40 allows some level of secured functions, for example for authentication or authorization purposes of executing applications.

Application of the invention allows an easy access for providers of chat/VoIP environments 21, 22, 23 to have their proprietary applications deployed at diverse brands and types of UE 40. Only the provider/owner of a SIP-AS 50, in relation to a RAN 30, has to be contacted for agreeing on application of chat/VoIP environments 21, 22, 23. As an effect of a single IMS client, each UE 40 having an IMS based UE chat/VoIP client 41 can communicate with the service application 54, thereby lessening the burden on manufacturers of having to provide as many as chat/VoIP clients for as many as types of UE.

The present invention is not limited to the embodiments as disclosed above, and can be modified and enhanced by those skilled in the art beyond the scope of the present invention as disclosed in the appended claims without having to apply inventive skills.

What is claimed is:

1. A method implemented by a mobile User Equipment (UE) the method comprising:
   executing a UE media service application for representing in a single graphical user interface (GUI) of the mobile UE different media service communication environments operated by different media service providers;
   receiving first status information related to a status of a first media service communication environment of the different media service communication environments; and
   representing in the single GUI the first status information related to the status of the first media service communication environment.

2. The method of claim 1, wherein the method further comprises registering for UE access to one of the different media service communication environments using the UE media service application.

3. The method of claim 1, wherein the method further comprises accessing, over a communication network, the different media service communication environments.

4. The method of claim 1, wherein the method further comprises representing in the single GUI the different media service communication environments.

5. The method of claim 1, wherein the method further comprises sending one or more identifiers over a communications network, each identifier identifying an entity from which to receive media content, wherein the one or more identifiers comprise an identifier related to the first media service communication environment.

6. The method of claim 1, wherein the first status information is availability of a user of the first media service communication environment.

7. The method of claim 1, wherein the first status information is availability of data of the first media service communication environment.

8. The method of claim 1, wherein the different media service communication environments comprise chat or Voice over Internet Protocol (VoIP) communication environments and wherein the first status information is data relating to a respective chat or VoIP communication session of the respective chat or VoIP communication environment.

9. The method of claim 1 further comprising:
   receiving second status information related to a status of a second media service communication environment of the different media service communication environments;
   wherein the first status information comprises data relating to an availability of a user associated with a chat or Voice over Internet Protocol (VoIP) communication session of the first media service communication environment; and/or
   wherein the second status information comprises data relating to an availability of a user associated with a chat or VoIP communication session of the second media service communication environment.

10. A mobile User Equipment (UE), the mobile UE comprising communications equipment, and processing equipment, wherein said processing equipment is configured to:
    execute a UE media service application for representing in a single graphical user interface (GUI) of the mobile UE different media service communication environments operated by different media service providers;
    receive first status information related to a status in a first media service communication environment of the different media service communication environments; and
    represent in the single GUI the first status information related to the status of the first media service communication environment.

11. The mobile UE of claim 10, wherein the processing equipment is configured to register for UE access to one of the different media service communication environments using the UE media service application.

12. The mobile UE of claim 10, wherein the processing equipment is configured to access, over a communication network, the different media service communication environments.

13. The mobile UE of claim 10, wherein the processing equipment is configured to represent in the single GUI the different media service communication environments.

14. The mobile UE of claim 10, wherein the processing equipment is configured to send one or more identifiers over a communications network, each identifier identifying an entity from which to receive media content, wherein the one or more identifiers comprise an identifier related to the first media service communication environment.

15. The mobile UE of claim 10, wherein the first status information is availability of a user of the first media service communication environment.

16. The mobile UE of claim 10, wherein the first status information is availability of data of the first media service communication environment.

17. The mobile UE of claim 10, wherein the different media service communication environments comprise chat or Voice over Internet Protocol (VoIP) communication environments and wherein the first status information is data relating to a respective chat or VoIP communication session of the respective chat or VoIP communication environment.

18. The mobile UE of claim 10 wherein the processing equipment is further configured to:
    receive second status information related to a status of a second media service communication environment of the different media service communication environments; and
    wherein the first status information comprises data relating to an availability of a user associated with a chat or Voice over Internet Protocol (VoIP) communication session of the first media service communication environment; and/or
    wherein the second status information comprises data relating to an availability of a user associated with a chat or VoIP communication session of the second media service communication environment.

19. A method implemented by a User Equipment (UE) media service client of a mobile UE, the method comprising:
    sending, from the UE media service client to an application server, one or more identifiers, each identifier identifying an entity from which to receive media content; and
    obtaining a mapping of a media service environment feature of a given one of different media service environments to a received identifier for coordinating communication between a media service client of a plurality of media service clients executed by the application server and the given one of the different media service environments; and
    wherein each of the media service clients accesses different ones of the different media service environments.

20. The method of claim 19, wherein the media service environment feature is related to an icon representation in a graphical user interface.

21. A User Equipment (UE) media service client of a mobile UE, the mobile UE comprising communications equipment, and processing equipment, wherein said processing equipment is configured to:

send, from the UE media service client to an application server, one or more identifiers, each identifier identifying an entity from which to receive media content; and obtain a mapping of a media service environment feature of a given one of different media service environments to a received identifier for coordinating communication between a media service client of a plurality of media service clients executed by the application server and the given one of the different media service environments; and wherein each of the media service clients accesses different ones of the different media service environments.

22. The mobile UE of claim 21, wherein the media service environment feature is related to an icon representation in a graphical user interface.

* * * * *